(12) United States Patent
Kim et al.

(10) Patent No.: US 9,180,646 B2
(45) Date of Patent: Nov. 10, 2015

(54) TOUCH SCREEN PANEL

(71) Applicant: Samsung Display Co., Ltd., Yongin, Gyeonggi-Do (KR)

(72) Inventors: Sun-Young Kim, Yongin (KR); Su-Weon Kim, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/199,401

(22) Filed: Mar. 6, 2014

(65) Prior Publication Data

US 2014/0255667 A1  Sep. 11, 2014

(30) Foreign Application Priority Data

Mar. 7, 2013 (KR) .................. 10-2013-0024311

(51) Int. Cl.
| | |
|---|---|
| B32B 3/00 | (2006.01) |
| B32B 3/10 | (2006.01) |
| G06F 3/041 | (2006.01) |
| G02F 1/1333 | (2006.01) |
| G06F 3/044 | (2006.01) |

(52) U.S. Cl.
CPC . *B32B 3/10* (2013.01); *G06F 3/041* (2013.01); *G02F 1/13338* (2013.01); *G06F 3/044* (2013.01); *G06F 3/0416* (2013.01); *Y10T 428/24851* (2015.01)

(58) Field of Classification Search
CPC ....... G06F 3/041; G06F 3/044; G06F 3/0412; G06F 2203/04111; G06F 2203/04112; G02F 1/13338; G02F 1/136286; B32B 3/10
See application file for complete search history.

(56) References Cited

U.S. PATENT DOCUMENTS

| | | |
|---|---|---|
| 2010/0123670 A1 | 5/2010 | Philipp |
| 2013/0242485 A1* | 9/2013 | Ohtani et al. ............ 361/679.01 |

FOREIGN PATENT DOCUMENTS

| | | |
|---|---|---|
| KR | 10-2011-0045800 A | 5/2011 |
| KR | 10-2011-0089423 A | 8/2011 |

* cited by examiner

*Primary Examiner* — Elizabeth Mulvaney
(74) *Attorney, Agent, or Firm* — Robert E. Bushnell, Esq.

(57) ABSTRACT

A touch screen panel in an embodiment of the present invention includes: a substrate, sensing electrodes disposed on an active area of the substrate and formed by patterning a metal into thin wires, and an anti-reflecting layer formed on the sensing electrode and having a lower light reflecting rate than the sensing electrodes.

10 Claims, 9 Drawing Sheets

TOUCH SCREEN PANEL

CLAIM OF PRIORITY

This application makes reference to, incorporates the same herein, and claims all benefits accruing under 35 U.S.C. §119 from an application for a TOUCH SCREEN PANEL earlier filed in the Korean Intellectual Property Office on 7 Mar. 2013 and there duly assigned Serial No. 10-2013-0024311.

BACKGROUND OF THE INVENTION

1. Field of the Invention

An aspect of the present invention relates to a touch screen panel.

2. Description of the Related Art

A touch screen panel is an input device capable of inputting a user's command by selecting instructions displayed on a screen, such as an image display device, or the like, with his/her hand or an object.

The touch screen panel is provided to a front face of the image display device and converts a contact position which is directly contacted with his/her hand or an object into an electrical signal. Therefore, the instruction contents selected at the contact position are recognized as input signals.

Since the touch screen panel as described above may substitute a separate input device such as a keyboard, a mouse which are connected to the image display device and operated, it has been widely used.

SUMMARY OF THE INVENTION

Embodiment of the present invention provide a touch screen panel having flexible characteristic by forming a sensing electrode by patterning metal having flexibility with thin wires, and also provides a touch screen panel which reduces the pattern reflection generated from the sensing electrodes having metal material.

An embodiment of the present invention relates to a touch screen panel includes: a substrate, sensing electrodes disposed on an active area of the substrate and formed by patterning a metal into thin wires, and an anti-reflecting layer formed on the sensing electrodes and having a lower light reflecting rate than the sensing electrodes.

The anti-reflecting layer may include at least one selected from the group consisting of a metal oxide layer, an opaque organic layer, a photosensitive layer and silver salt formed on the sensing electrodes.

The anti-reflecting layer may include a material having black color.

The active area may be divided into at least two regions, which include a first region having a lighter color of the anti-reflecting layer and a second region having a darker color of the anti-reflecting layer than that of the first region, and a predetermined pattern may be displayed by difference in density.

The pattern may include a drawing pattern or a character pattern.

The sensing electrodes may be formed by patterning an opaque metal in a mesh shape with thin wires.

The sensing electrodes may include first sensing electrodes connected in a first direction and second sensing electrodes connected in a second direction.

The substrate may be a film substrate.

The active area may be divided into at least two regions, which include a first region having the anti-reflecting film lightly tinted with black and a second region having the anti-reflecting film more heavily tinted with black compared to the first region.

The touch screen panel may further comprise outside wiring lines formed on a non active area outside of the active area.

The outside wiring lines may be made of the same material of at least one of the sensing electrodes.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF THE INVENTION

Hereinafter, preferred embodiments of the present invention will be described in detail with reference to the accompanying drawings.

Figure 1:
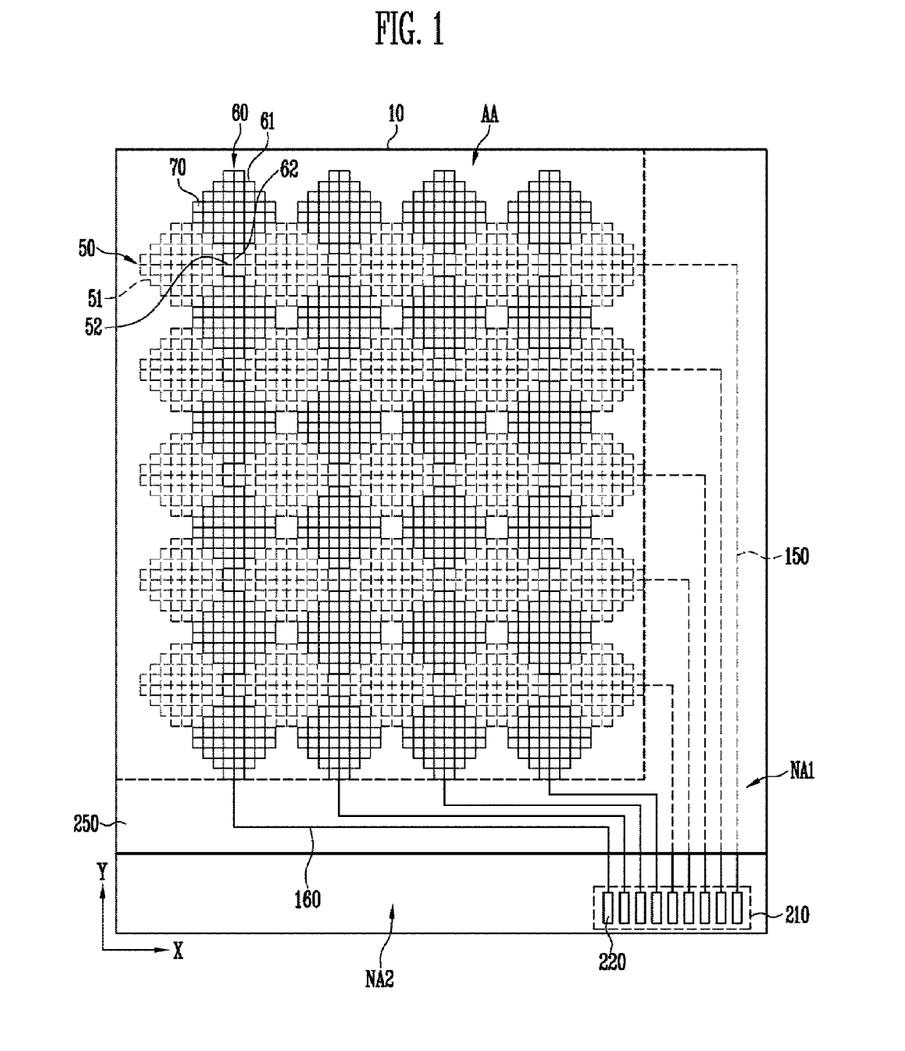
FIG. 1 is a plan view showing a touch screen panel according to an exemplary embodiment of the present invention.
Figure 2:
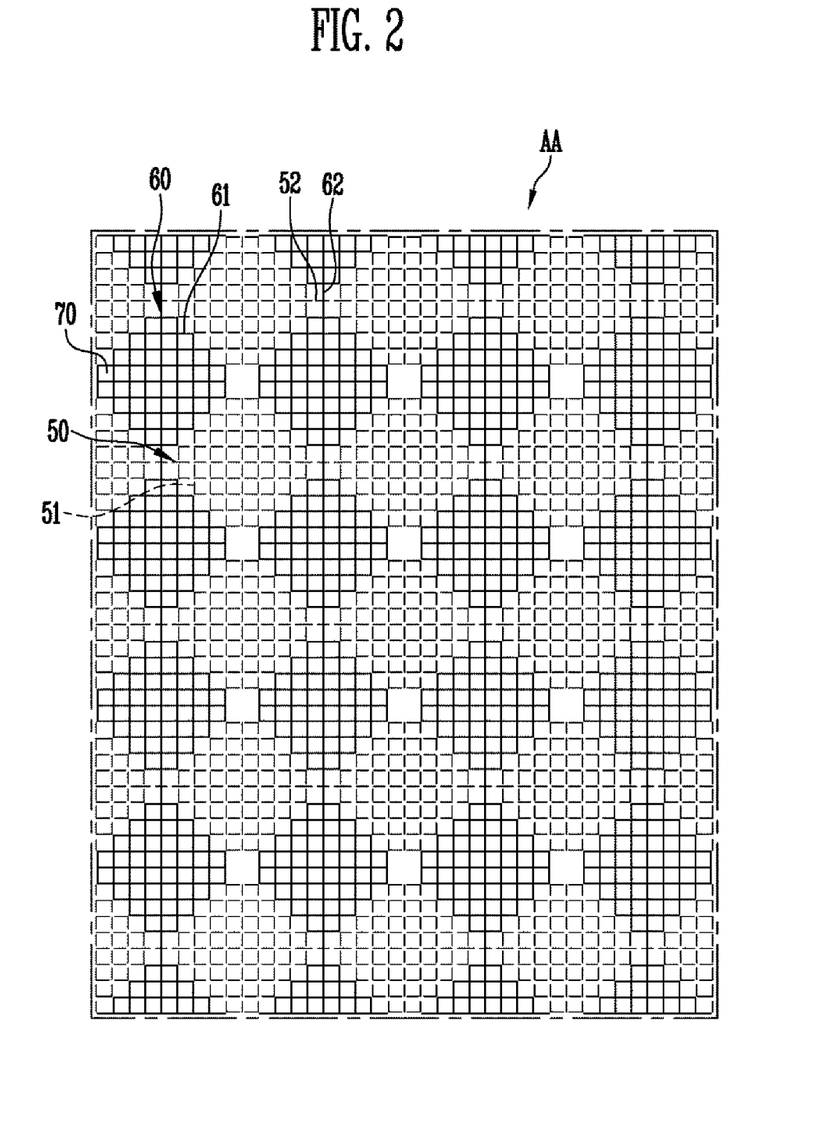
FIG. 2 is a plan view showing main components of sensing electrodes shown in FIG. 1.

FIG. 1 is a plan view showing a touch screen panel according to an exemplary embodiment of the present invention, and FIG. 2 is a plan view showing main components of sensing electrodes shown in FIG. 1

Referring to FIGS. 1 to 2, the touch screen panel according to an exemplary embodiment of the present invention includes: a substrate 10, sensing patterns 50 and 60 formed on the substrate 10 and outside wiring lines 150 and 160 electrically connecting the sensing patterns 50 and 60 with a pad part 210.

The substrate 10 may be with a substantially transparent substrate, such as a glass substrate or a plastic substrate. Particularly, in the case in which the substrate 10 is a flexible film substrate, there is an advantage of providing sufficient flexibility. However, the present invention is not limited thereto, the material of the substrate 10 may be varied according to design intention.

The sensing electrodes 50 and 60 are disposed on an active area AA of the substrate 10. The active area AA is an area for detecting a touch input. For example, it may be disposed to overlap with a display area.

The sensing electrodes 50 and 60 may include first sensing electrodes 50 formed to be connected in a first direction, for example, an X-axis direction, and second sensing electrodes 60 formed to be connected in a second direction intersecting with the first direction, for example, a Y-axis direction.

The sensing electrodes 50 and 60 may be formed by patterning an opaque metal having sufficient flexibility with a plurality of thin wires. For forming the sensing electrodes 50 and 60, low resistance metals such as Ag, Al, Cu, Cr, Ni, or nano metals conductive layer such as silver nano-wire (AgNW) are may be used, but are not limited thereto.

In the case in which the sensing electrodes 50 and 60 are formed of an opaque metal, multiple openings 70 may be formed therein, so as to transmit light from a display panel (not shown) which is disposed under a lower part thereof, by patterning the sensing electrodes 50 and 60 with thin wires in a mesh shape. Here, visibility of the sensing electrodes may be prevented by adjusting a width and thickness of the thin wires.

A configuration of the sensing electrodes 50 and 60 will be described in more detail. The first sensing electrodes 50 may be configured with first sensing cells 51 arranged along the first direction in plural and first connection patterns 52 electrically connected the first sensing cells 51 to each other, and the second sensing electrodes 60 may be configured with second sensing cells 61 arranged along the second direction in plural and second connection patterns 62 electrically connected the second sensing cells 61 to each other.

In addition, the sensing cells 51 and 61 may have multiple openings 70, thereby implementing the sensing electrodes 50 and 60 in a mesh shape.

Here, for example, the sensing cells 51 and 61 may be formed in a diamond shape, but the shape of the sensing cells according to the present invention is not limited thereto.

A display panel having a plurality of pixels arranged in a regular pattern is disposed on the lower side of the substrate 10 having the sensing cells 51 and 61. Therefore, if a shape and an arrangement of the sensing cells 51 and 61 have a regularity, a moiré phenomenon may be generated by interference between pixels in the display panel. As a result, the display quality may be degraded. To prevent this, the sensing cells 51 and 61 may be patterned with a random curved shape. However, for convenience description, as described in FIG. 1, the sensing cells 51 and 61 may be implemented in a same diamond shape.

When the metal having sufficient flexibility is patterned with thin wires and the sensing electrodes 50 and 60 are formed, the sensing electrodes 50 and 60 have flexibility itself and thereby are usefully applied to the flexible touch screen panel.

The outside wires 150 and 160 are connected to one end of the sensing electrodes 50 and 60

The outside wiring lines 150 and 160 are formed on the non active areas NA1 and NA2 disposed on outside of the active area AA. Here, the non active area is divided into a first non active area NA1 including the outside wiring lines 150 and 160, and a second non active area NA2, which is positioned on the external side of the first non active area NA1 The second non-active area NA2 has a pad unit 210 connecting the outside wiring lines 150 and 160 to an external driving circuit The outside wiring lines 150 and 160 may include first outside wiring lines 150 for connecting the first sensing electrodes 50 to predetermined pads 220 disposed in the pad unit 210 and second outside wiring lines 160 for connecting the second sensing electrodes 60 to predetermined pads 220 disposed in the pad unit 210.

The outside wiring lines 150 and 160 transfers driving signals supplied from an outside touch driving circuit through the pad unit 210 to the sensing electrodes 50 and 60, or transfers signals detected from the sensing electrodes 50 and 60 to a touch sensing circuit (not shown). Therefore, the touch sensing circuit may recognize a user's touch position.

Here, the first outside wiring lines 150 may be formed of the same material of the first sensing electrodes 50 connected thereto, and the second outside wiring lines 160 may be formed of the same material of the second sensing electrodes 60 connected thereto. In this case, since the outside wiring lines 150 and 160 may be formed by the same process as the process of the sensing electrodes 50 and 60, a manufacturing process may be further simplified.

For example, the first sensing electrodes 50 and the first outside wiring lines 150 connected thereto may be formed on one surface of the substrate 10, and the second sensing electrodes 60 and the second outside wiring lines 160 connected thereto may be formed on an insulating layer 250. In this case, the embodiment of the present invention may be implemented in two layered sensor structure in which the insulating layer 250 is formed between the first sensing electrodes 50 and the second sensing electrodes 60. However, the present invention is not limited thereto, the first and second sensing electrodes 50 and 60 may be disposed on the same layer, in this case, and the insulating layer may be partially formed on the intersecting part thereof.

Meanwhile, when the sensing electrodes 50 and 60 are implemented as two layered sensor structure, the insulating layer 250 is only formed on the active are AA and the first non active area NA1, and is not formed on the second non active area NA2 having the pad unit 210.

The touch screen panel, according to the exemplary embodiment of the present invention as described above, is provided to a touch screen panel having flexibility due to forming of the sensing electrodes 50 and 60 by a metal having flexibility. In addition, by patterning the sensing electrodes 50 and 60 in a mesh shape having a plurality of openings 70, visibility of the sensing electrodes 50 and 60 can be minimized while the light from the display panel can be transmitted.

However, when the sensing electrodes 50 and 60 are formed of a metal, the display quality may be degraded due to a metallic luster and a high reflecting rate.

Accordingly, in embodiments of the present invention, the touch screen panel, which reduces the pattern reflection of the sensing electrodes 50 and 60 by forming an anti-reflecting layer on the sensing electrodes 50 and 60, is provided, and will be described below with reference to the FIGS. 3 to 6B in detail.

Figure 3:
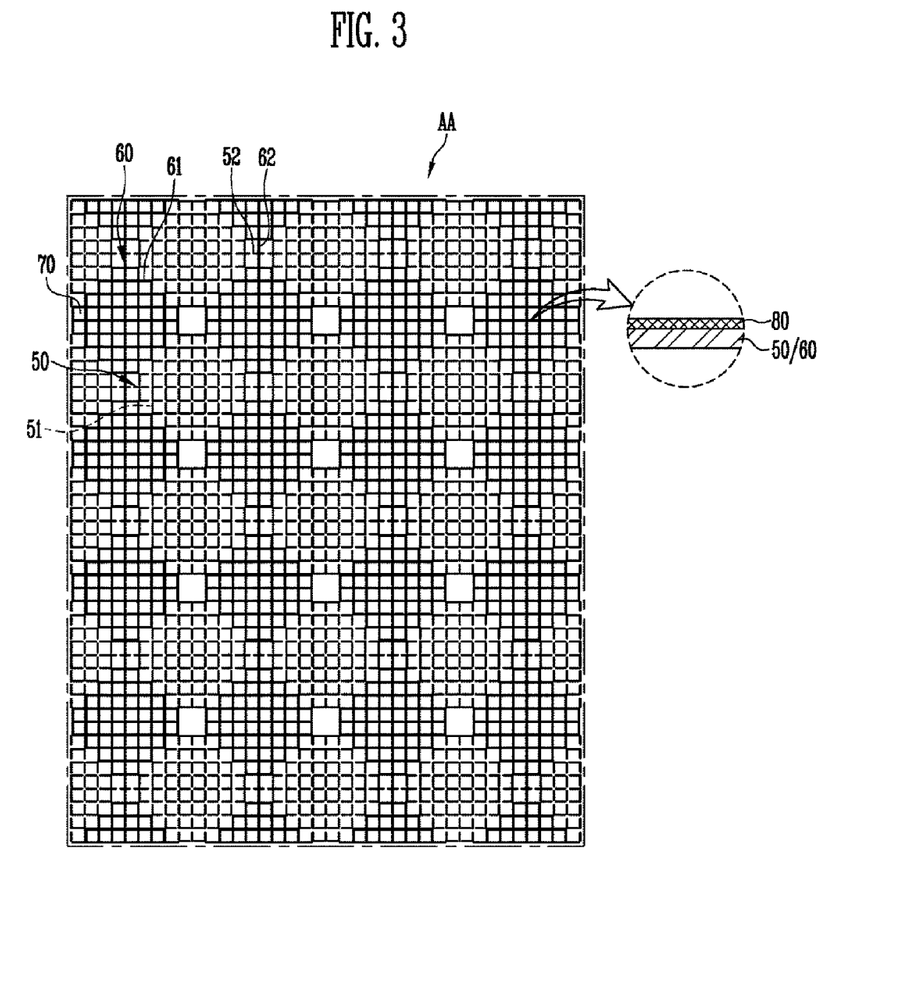
FIG. 3 is a plan view showing an example of forming an anti-reflecting layeron the sensing electrodes shown in FIG. 2, according to the exemplary embodiment of the present invention.

FIG. 3 is a plan view showing an example of forming an anti-reflecting layer on the sensing electrodes shown in FIG. 2, according to the exemplary embodiment of the present invention. Meanwhile, in FIG. 3, components that are similar to those of FIG. 2 will be denoted by the same reference numerals and detailed description thereof will be omitted.

Referring to FIG. 3, in the present invention, the anti-reflecting layer 80 having a lower light reflecting rate than that of the sensing electrodes 50 and 60 may be formed on the sensing electrodes 50 and 60 made of metal, thereby removing a metal luster and reducing a light reflecting rate.

To this end, the anti-reflecting layer 80 may be formed through blackening treatment on the surface of the sensing electrodes 50 and 60. That is, the anti-reflecting layer 80 may be implemented of a material having black or dark color.

For example, the anti-reflecting layer 80 may be formed through forming an oxide layer on the surface of the sensing electrodes 50 and 60 oxidized itself, coating an organic layer onto the sensing electrodes 50 and 60, specifically with an organic material having black color (or dark color), or a process of which a photosensitive material or a silver salt is formed on the sensing electrodes 50 and 60 and then exposed thereon to be black, or the like. In this case, the anti-reflecting layer 80 may include at least one in a group including a metal oxide layer, an opaque organic layer, a photosensitive layer and silver salt.

As described above, when the anti-reflecting layer 80 is formed on the sensing electrodes 50 and 60 made of metal, a sparkling phenomenon due to a metal luster may be prevented and reflection is reduced. Especially, reflection is prevented in state in which the display panel is off and the active area AA is displayed in black. In addition, moiré phenomenon due to interference between the sensing electrodes 50 and 60 and the pixels disposed on a lower side of the touch screen panel is prevented, therefore, pattern reflection may be reduced.

Figure 4A:
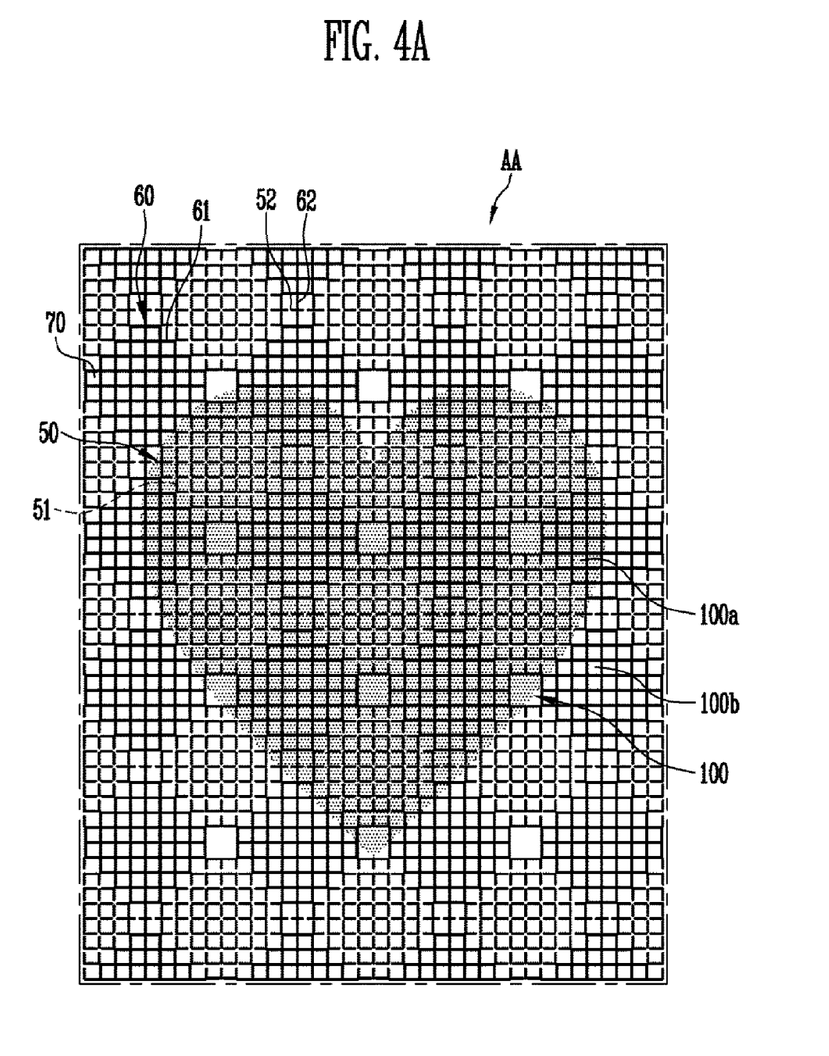
FIGS. 4A and 4B are plan views showing an example of forming an anti-reflecting layer on the sensing patterns shown in FIG. 2, according to another exemplary embodiment of the present invention.
Figure 4B:
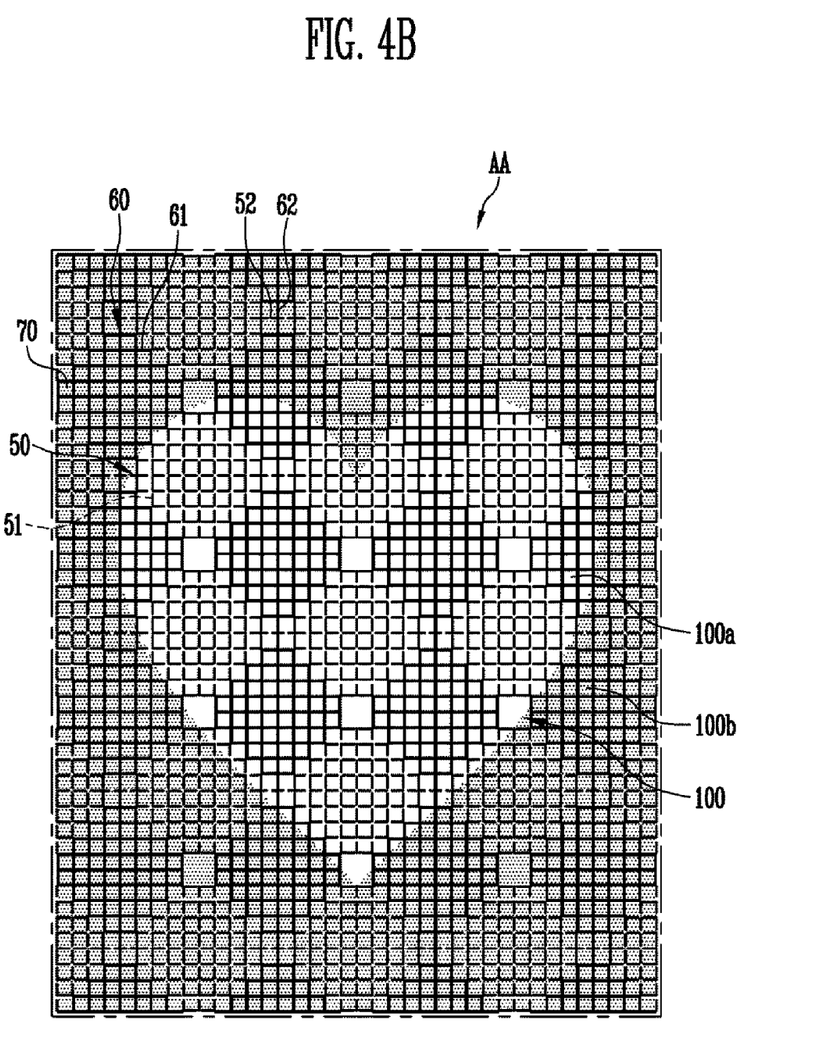

FIGS. 4A and 4B are plan views showing an example of forming an anti-reflecting layer on the sensing patterns shown in FIG. 2, according to another exemplary embodiment of the present invention. In FIGS. 4A and 4B, components that are similar to those of FIGS. 2 to 3 will be denoted by the same reference numerals and detailed description thereof will be omitted.

Referring to FIGS. 4A to 4B, through a first blackening treatment for uniformly blackening the sensing electrodes 50 and 60 disposed on the active area AA, the anti-reflecting layer 80 shown in FIG. 3 is formed, and then, through a second blackening treatment for blackening only a particular region of the active area AA, additionally, a predetermined pattern is displayed on the active area AA.

For example, after the first blackening treatment for uniformly blackening the sensing electrodes 50 and 60 disposed on the active area AA is performed, additional second blackening treatment may be performed to only inner side 100a of a heart pattern 100 as shown in FIG. 4A, or additional second blackening treatment may be performed to only outer side 100b of the heart pattern 100, as shown in FIG. 4B to display a certain pattern, such as the heart pattern 100.

Here, the second blackening treatment is performed in the same manner and/or using the same material as that of the first blackening treatment, or is performed in a different manner and/or using a different material from that of the first blackening treatment. Accordingly, an area where the second blackening treatment is performed has darker color than before, due to an increased thickness of the anti-reflecting layer part having black (or dark) color is improved or an increased density thereof.

That is, the active area AA is divided into at least two regions, a first region in which the anti-reflecting layer lightly tinted with black, specially a light black color, and a second region in which the anti-reflecting layer heavily tinted with black compared to the first region. In other words, the first region has the anti-reflecting layer having a light color, and the second region has the anti-reflecting layer having a thick dark color. Therefore, a predetermined pattern therebetween as boundary is displayed in a predetermined pattern on the active area AA by difference in color or density.

The pattern as described above may be recognized to a user in the state in which the display panel is off, and may be recognized as a decoration pattern to a user so as to provide decoration effect.

As described above, when the decoration pattern is displayed by dividing the active area AA and performing an additional blackening treatment to a selected region, the decoration pattern is first recognized to a user and thereby effectively preventing the pattern reflection of the sensing electrodes 50 and 60 and providing an aesthetic effect.

Meanwhile, in the FIGS. 4A to 4B, an example in which the active area AA is divided into two regions and displayed a predetermined pattern, however, the active area AA may be divided into more regions according to the pattern to be displayed.

Figure 5A:
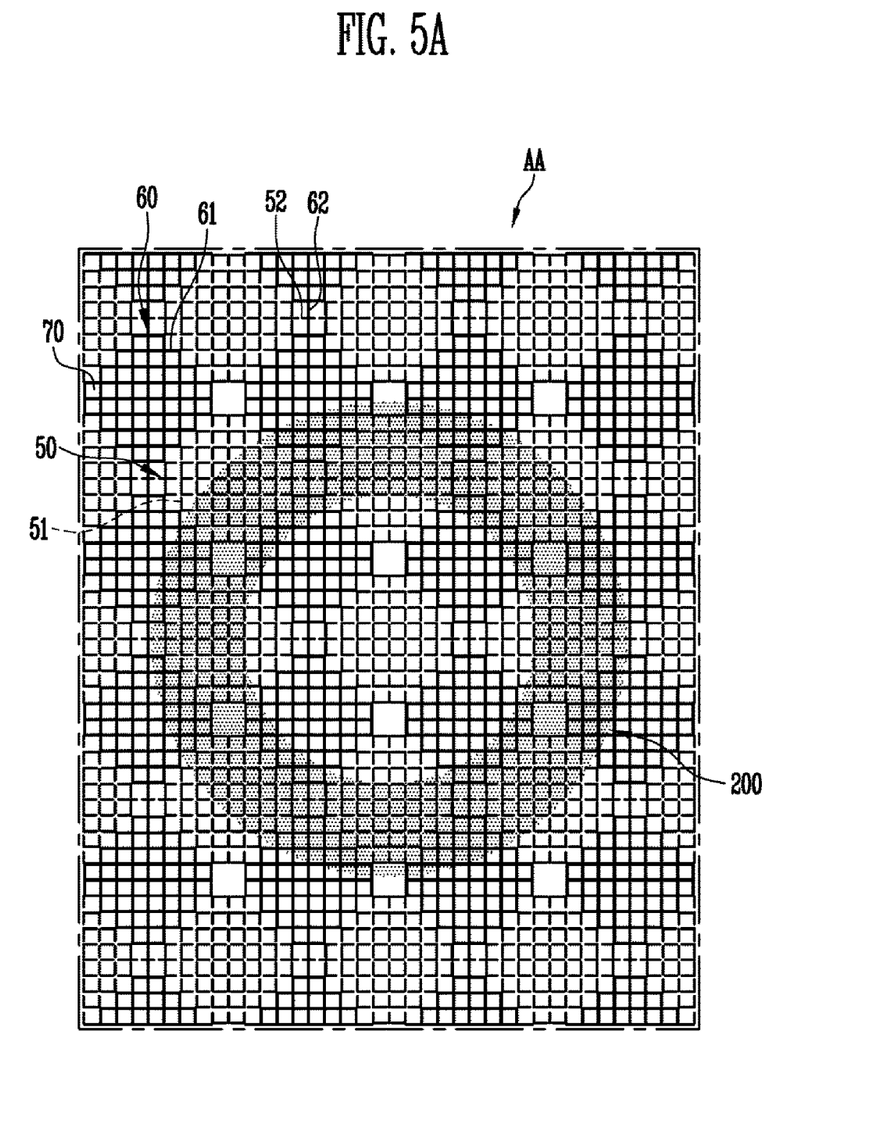
FIGS. 5A and 5B are plan views showing an example of forming an anti-reflecting layer on the sensing patterns shown in FIG. 2, according to another exemplary embodiment of the present invention.
Figure 5B:
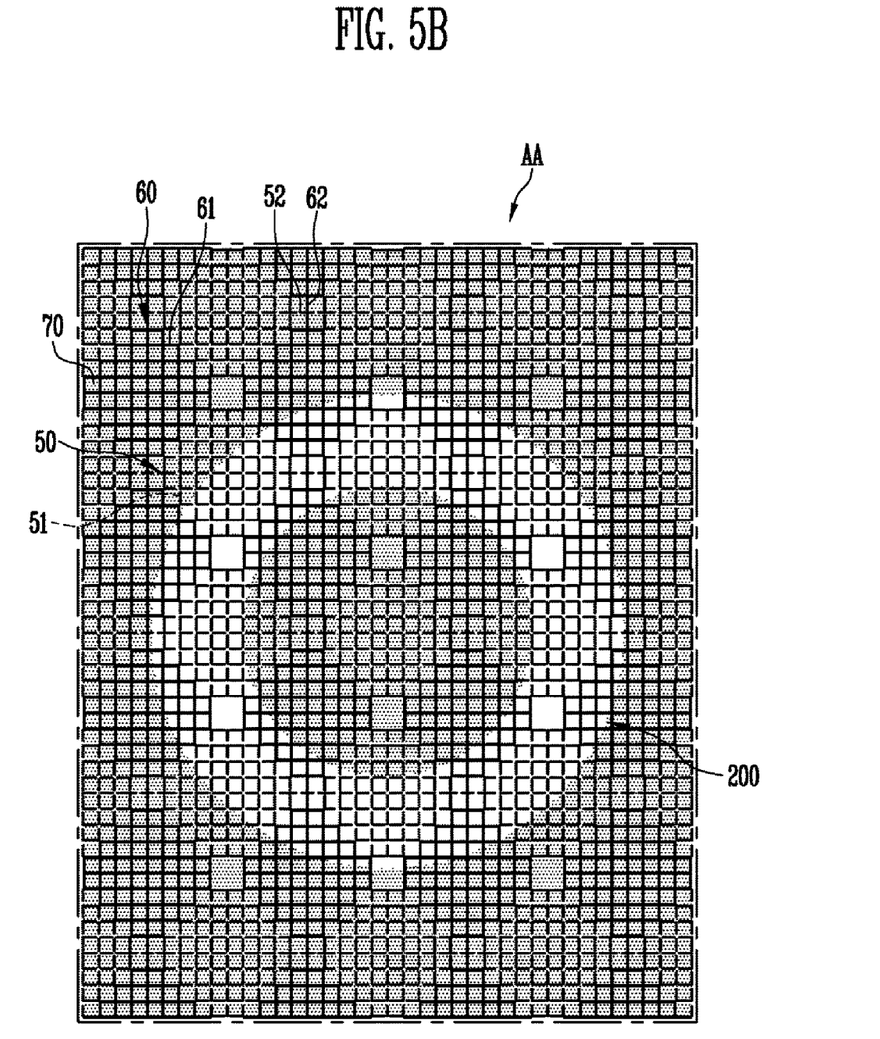

For example, FIGS. 5A to 5B as described above, the active area AA is divided into three regions and may be displayed a circle pattern 200.

Figure 6A:
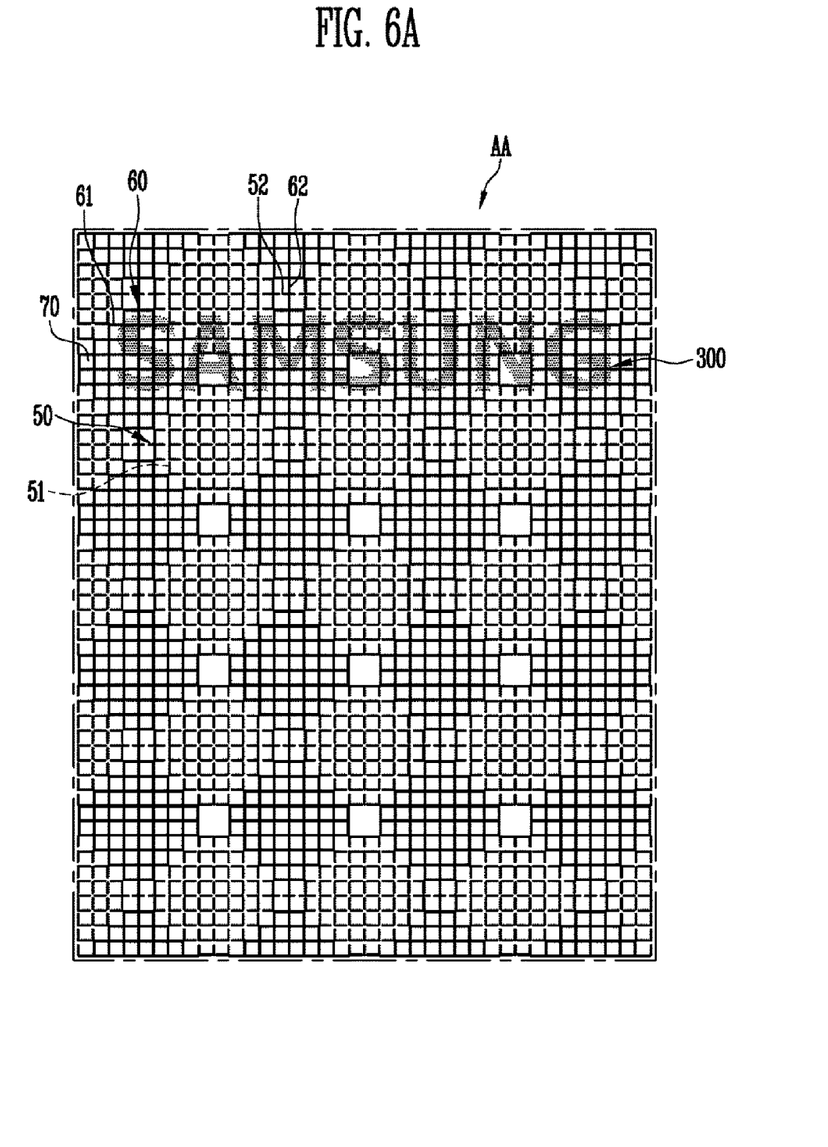
FIGS. 6A and 6B are plan views showing an example of forming an anti-reflecting layer on the sensing patterns shown in FIG. 2, according to another exemplary embodiment of the present invention.
Figure 6B:
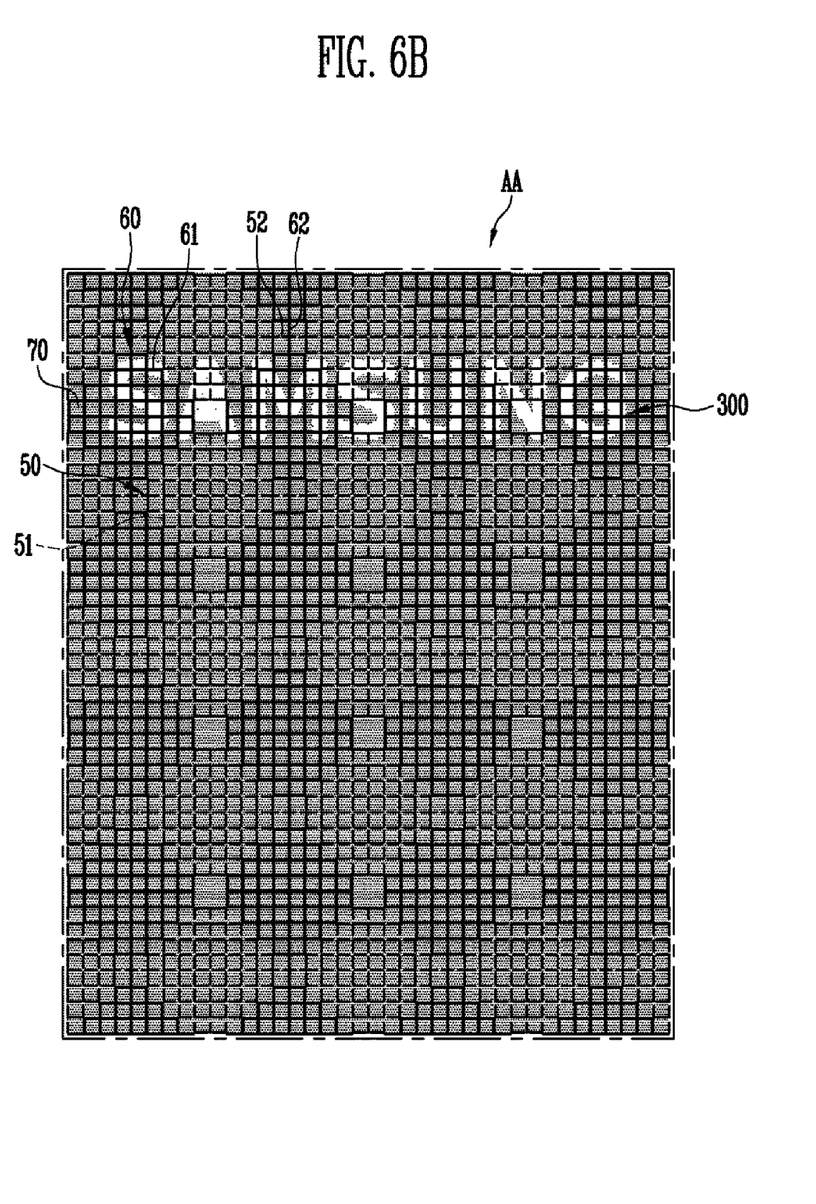

In addition, the pattern displayed on the active area AA is not limited to the drawing pattern, for example, as shown in FIGS. 6A to 6B, a letter pattern 300, such as a logo, may be displayed.

Further, the blackening treatment to the active area AA is not limited to the second treatment, and complex and accurate pattern may be displayed through a third or more blackening treatments.

By way of summation and review, as a type of implementing the touch screen panel, a resistive type, an optical sensing type, a capacitive type, and the like, are known. Among them, the capacitive type touch screen panel converts a touch input into an electrical signal, when a conductive sensing electrodes senses a change in capacitance formed other adjacent sensing patterns or ground electrodes, or the like, by contacting with a user's hand or an object.

The touch screen panel as described above may generally be implemented by attaching to external surface of an image display device such as a liquid crystal display device, or an organic light emitting display device, or may be implemented in a integral shape in which a sensing electrode is directly formed on the display panel.

Also, a flexible display device has been recently developed, therefore, a touch screen panel attached on a flexible display device is also required to have a flexible characteristics.

However, the touch screen panel in the related art has a shape in which sensing electrodes are implemented on a substrate using a transparent conductive material such as indium tin oxide (ITO), thereby generating a crack or the like due to a physical deformation, such that a flexible characteristic is not provided.

As set forth above, in the touch screen panel according to an embodiment of the present invention, flexible touch screen panel is provided by forming sensing electrodes by patterning metal having flexibility with thin wires, while the pattern reflection is reduced by forming the anti-reflecting layer having a low anti-reflecting rate on the sensing electrode.

Also, in the present invention, an active area is dived into multiple areas and gives density differences on the anti-reflecting layer in each area to display a predetermined pattern. The pattern is recognized as a decoration pattern to a user, and thereby making it possible to effectively prevent pattern reflection which is recognized the pattern of the sensing electrode itself.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A touch screen panel comprising,
   a substrate;
   sensing electrodes disposed on an active area of the substrate and formed by patterning a metal into thin wires; and
   an anti-reflecting layer formed on the sensing electrodes and having a lower light reflecting rate than the sensing electrodes, the active area including a first region having the anti-reflecting film lightly tinted with black and a second region having the anti-reflecting film more heavily tinted with black compard to the first region.

2. The touch screen panel according to claim 1, wherein the anti-reflecting layer includes at least one selected from the group consisting of a metal oxide layer, an opaque organic layer, a photosensitive layer and silver salt formed on the sensing electrodes.

3. The touch screen panel according to claim 1, wherein the anti-reflecting layer is made of a material having a black color.

4. The touch screen panel according to claim 1, wherein the anti-reflecting layer of the second region has a darker color than the anti-reflecting layer of the first region, and a predetermined pattern is displayed by difference in density.

5. The touch screen panel according to claim 4, wherein the pattern include a drawing pattern or a letter pattern.

6. The touch screen panel according to claim 1, wherein the sensing electrodes are formed by patterning an opaque metal in a mesh shape with thin wires.

7. The touch screen panel according to claim 1, wherein the sensing electrodes include first sensing electrodes connected in a first direction and second sensing electrodes connected in a second direction.

8. The touch screen panel according to claim 1, wherein the substrate is a film substrate.

9. The touch screen panel according to claim 1, further comprising outside wiring lines formed on a non active area outside of the active area.

10. The touch screen panel according to claim 9, wherein the outside wiring lines are made of the same material of at least one of the sensing electrodes.

* * * * *